United States Patent
Crombez

(10) Patent No.: US 7,894,967 B2
(45) Date of Patent: Feb. 22, 2011

(54) REGENERATIVE BRAKING WITH HILL DESCENT CONTROL

(75) Inventor: Dale Scott Crombez, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 934 days.

(21) Appl. No.: 11/755,526

(22) Filed: May 30, 2007

(65) Prior Publication Data

US 2008/0300762 A1  Dec. 4, 2008

(51) Int. Cl.
*B60L 7/22* (2006.01)
*B60T 13/00* (2006.01)

(52) U.S. Cl. .............................. 701/70; 701/51; 303/15

(58) Field of Classification Search ................ 701/70, 701/51, 83, 22, 71; 303/15, 152, 155
See application file for complete search history.

(56) References Cited

U.S. PATENT DOCUMENTS

| | | | |
|---|---|---|---|
| 5,511,859 A | 4/1996 | Kade et al. | |
| 6,033,041 A * | 3/2000 | Koga et al. | 303/152 |
| 6,122,588 A | 9/2000 | Shehan et al. | |
| 6,283,240 B1 | 9/2001 | Beever | |
| 6,364,434 B1 | 4/2002 | Sway-Tin et al. | |
| 6,691,013 B1 | 2/2004 | Brown | |
| 6,988,779 B2 | 1/2006 | Amanuma et al. | |
| 2002/0116099 A1* | 8/2002 | Tabata et al. | 701/22 |
| 2004/0238244 A1* | 12/2004 | Amanuma et al. | 180/65.2 |
| 2005/0218718 A1* | 10/2005 | Iwatsuki et al. | 303/177 |

\* cited by examiner

*Primary Examiner*—Tan Q Nguyen
(74) *Attorney, Agent, or Firm*—Jerome R. Drouillard; David B. Kelley

(57) ABSTRACT

An automotive hill descent control includes a friction-braking subsystem and a non-friction braking subsystem with engine-based braking and regenerative braking. The regenerative and engine-based braking systems may be controlled according to the position of a manual switch, as well as inversely proportionally to the slope upon which a vehicle is being operated, and according to the speed of the vehicle.

23 Claims, 3 Drawing Sheets

REGENERATIVE BRAKING WITH HILL DESCENT CONTROL

BACKGROUND OF THE INVENTION

1. Field of the Invention

The present invention relates to a system for providing a vehicle having a hybrid drive system with a hill descent control.

2. Disclosure Information

Vehicles intended to be driven off-road are sometimes equipped with a hill descent control. Typically, hill descent controls use powertrain braking, as well as friction braking, to provide more controlled operation on a severe downgrade. The use of hill descent control in a vehicle equipped with a hybrid powertrain having both engine-driven and electrodrive capability presents a unique challenge inasmuch as although it is desirable to operate a vehicle's traction motor regeneratively, in other words, to use regenerative braking, such regenerative braking may cause one or more wheels to slip undesirably on a severe downgrade.

Certain known regenerative braking systems increase regenerative braking in direct proportion to the magnitude of the slope being negotiated. This, however, may cause unwanted wheel slip.

SUMMARY OF THE INVENTION

The present invention solves problems associated with the integration of regenerative braking into a vehicle having a hill descent control system.

According to an embodiment of the present invention, an automotive braking system includes a friction braking subsystem, a non-friction braking subsystem, and an incline detection system for determining when a vehicle equipped with the present braking system is being operated on an incline. In several embodiments, the incline sensor system further determines the magnitude of an incline.

A controller operates the non-friction braking subsystem based upon at least the output of the incline detection system. The controller provides a first maximum amount of non-friction braking when the vehicle is being operated upon a surface having an inclination less than a predetermined threshold inclination, as detected either by the vehicle's operator, or by a sensor, and a second maximum amount of non-friction braking when the vehicle is being operated on a surface having an inclination greater than the predetermined threshold inclination. The second maximum amount of non-friction braking is generally less than the first maximum amount of non-friction braking. In an embodiment of the invention, the second amount of non-friction braking may be generally inversely proportional to the magnitude of an incline upon which the vehicle is being operated, or may be a fixed amount of maximum non-friction braking.

According to another aspect of the present invention, a non-friction braking system may include a regenerative braking system and an engine-based braking system. A vehicle speed sensor may be operatively connected with the controller, to permit the controller to operate the engine-based braking system so as to limit engine and/or regenerative braking at speeds below a predetermined speed threshold.

In another embodiment according to the present invention, the controller limits both engine braking and regenerative braking at speeds below a predetermined speed threshold.

According to another embodiment of the present invention, a second maximum amount of non-friction braking, which is employed in the event that the vehicle is being operated at an incline greater than a predetermined threshold, is a null, or zero amount of regenerative braking.

According to another aspect of the present invention, a method for operating an automotive braking system having a friction braking subsystem and a non-friction braking subsystem including an engine-based braking system and a regenerative braking system includes: detecting operation of a vehicle equipped with the braking system upon an incline, including detecting the magnitude of the incline, and providing a first maximum permissible amount of non-friction braking when a vehicle equipped with the braking system is being operated upon a surface having a magnitude of inclination less than a first predetermined threshold inclination, while providing a second maximum permissible amount of non-friction braking when the vehicle is being operated upon a surface having a magnitude of inclination greater than the first predetermined threshold. The second maximum permissible amount of braking is less than the first maximum permissible amount of braking, and the second amount may be reduced to zero in the case of both the engine-based braking system and regenerative braking system.

The present braking control system provides a hill descent control which precisely modulates the operation of the vehicle's braking systems on a downgrade, without causing any substantial impact on the amount of regenerative energy captured by the system. In general, regenerative braking is usually not an important factor in the operation of a hill descent control, because the vehicle simply lacks much kinetic or potential energy which may be converted via a regenerative braking system.

The present hill descent control system provides the advantage that wheel slip due to both engine-based braking and regenerative braking is avoided.

The present hill descent control system advantageously uses well-established friction braking techniques at higher angles of inclination, so as to provide well-modulated descent control.

Other advantages, as well as features and objects of the present invention will become apparent to the reader of this specification.

DETAILED DESCRIPTION OF THE PREFERRED EMBODIMENTS

Figure 1:
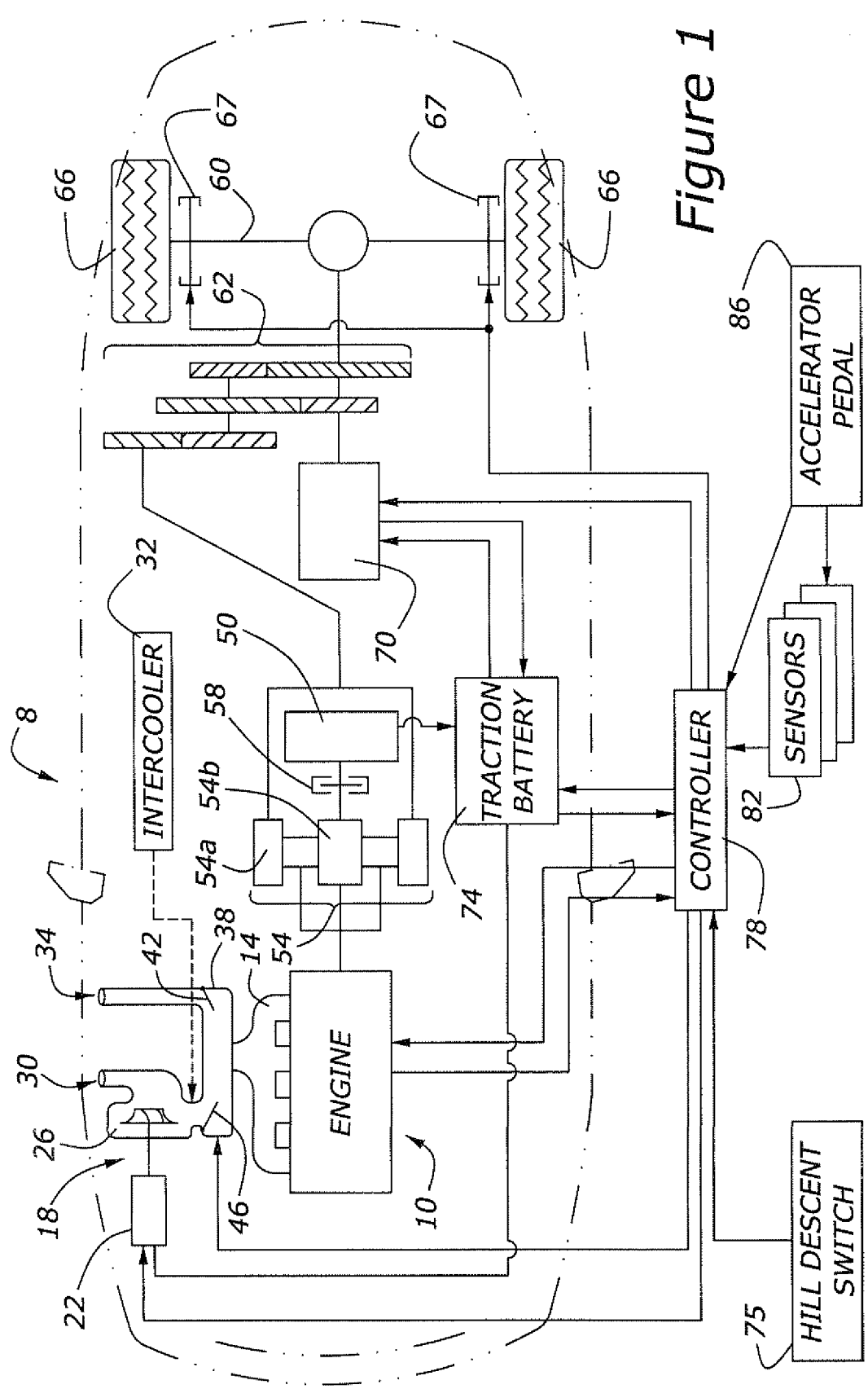
FIG. 1 is a schematic representation of an off-road vehicle having a hill descent control according to the present invention.

As shown in FIG. 1, vehicle 8 has an engine, 10, which is equipped with an inlet manifold 14 supplied with air by means of a motor-driven charge air booster, 18, having a motor 22, a compressor wheel 26, and an air inlet 30. Air inlet 34 is also provided. Valves 42 and 46 control airflow into intake log 38 and then into intake manifold 14. Those skilled in the art will appreciate in view of this disclosure the type of engine 10 employed with the present invention may be selected from a variety of powerplants suitable for use in an automotive vehicle.

Engine 10 drives generator 50 through planetary transmission 54 having a ling gear 54a which is connected via gearset 62 to rear wheels 66 of vehicle 8. Engine 10, through sun gear 54b, also drives generator set 50 through a brake, 58. Electrical power from generator 50 is stored in traction battery 74, which may be regeneratively charged by means of traction motor 70, which also drives rear wheels 66 through gearset 62. Controller 78 operates engine 10 and traction motor 70. Controller 78 also operates brakes 67, which are applied to road wheels 66.

Controller 78 receives signals from a number of sensors 82, including a vehicle speed sensor, inclination sensors, and a sensor (not shown) which detects the position of accelerator pedal 86. The inclination sensors included within group 82 may include not only a direct slope sensor, which senses the inclination of the roadway in a direction parallel to the direction of travel, but also a side slope sensor, which detects inclination of the roadway in a direction perpendicular to the direction of travel. Other methods which indirectly infer slope using various sensors may also be utilized. Such sensors and methods are known to those skilled in the art of vehicle controls, and the selection of appropriate sensors is beyond the scope of the present invention.

When the vehicle driver moves his foot from accelerator pedal 86, it is a sign that he desires non-friction, or powertrain-based, braking to occur, and this braking may be handled by either or both of engine 10 and traction motor 70, with the traction motor operating regeneratively. Alternatively, a hill descent control switch 75 is provided for manual activation by the vehicle's driver.

Figure 2:
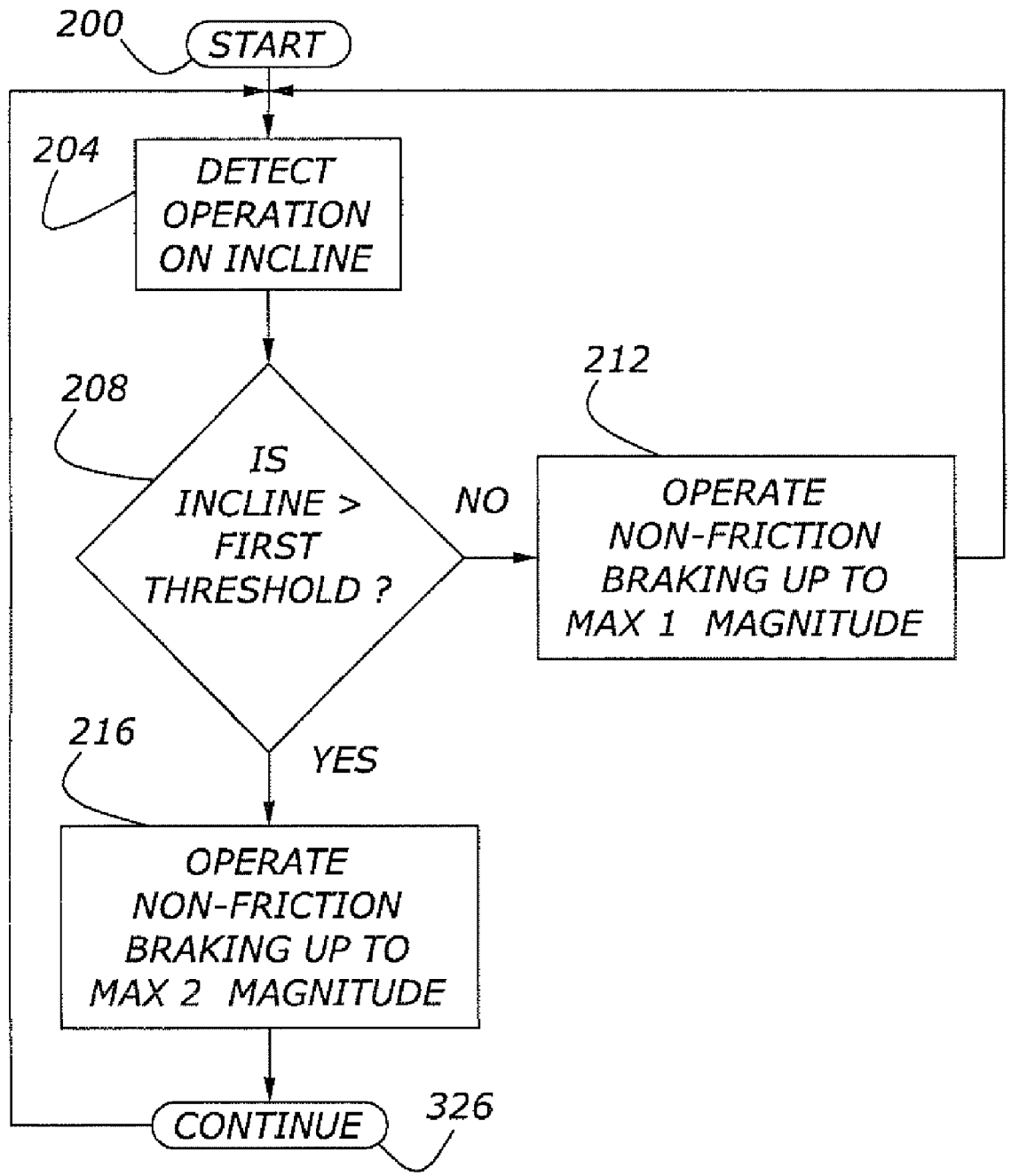
FIG. 2 is a flow chart showing a first embodiment of a hill descent control method according to the present invention.

As shown in FIG. 2, a first method according to the present invention starts at block 200, and then moves to block 204, wherein controller 78 receives a sensor signal which may indicate operation on an incline. At block 208, the magnitude of the incline, if any, is compared with a first threshold value. If the answer to the question at block 208 is no, this means that the magnitude incline is less than a first incline threshold, and the routine moves to block 212, wherein the non-friction braking system is operated up to a maximum amount of braking force MAX1, which is a first maximum permissible amount of non-friction braking. This means that both the engine-based braking system and the regenerative braking system, taken together, will be used to provide braking of wheels 66 up to a first maximum permissible amount.

After block 212, the routine continues once again with block 204, and again reaches block 208. When the question posed at block 208 is answered in the affirmative, the vehicle is being operated on an incline greater than the first threshold incline, and the routine moves to block 216, wherein the non-friction braking will be operated at a force level up to MAX2, which is a second maximum amount of non-friction braking. The magnitude of MAX1 is less than the magnitude of MAX2, and in a preferred embodiment, the MAX2 value may be reduced to zero, which effectively means that neither the engine-based braking, nor the regenerative braking is operated, with the vehicle being allowed to descend a hill using solely friction brakes.

According to another preferred embodiment, the MAX1 and MAX2 values at blocks 212 and 216 of FIG. I are preferably inversely proportional to the slopes upon which the vehicle is being operated. In other words, as the inclination increases, the amount of non-friction braking employed decreases such that the amount of non-friction braking is inversely proportional to a slope upon which the vehicle is being operated.

Having set the non-friction braking to the MAX2 magnitude at block 216, the routine continues at block 326.

Figure 3:
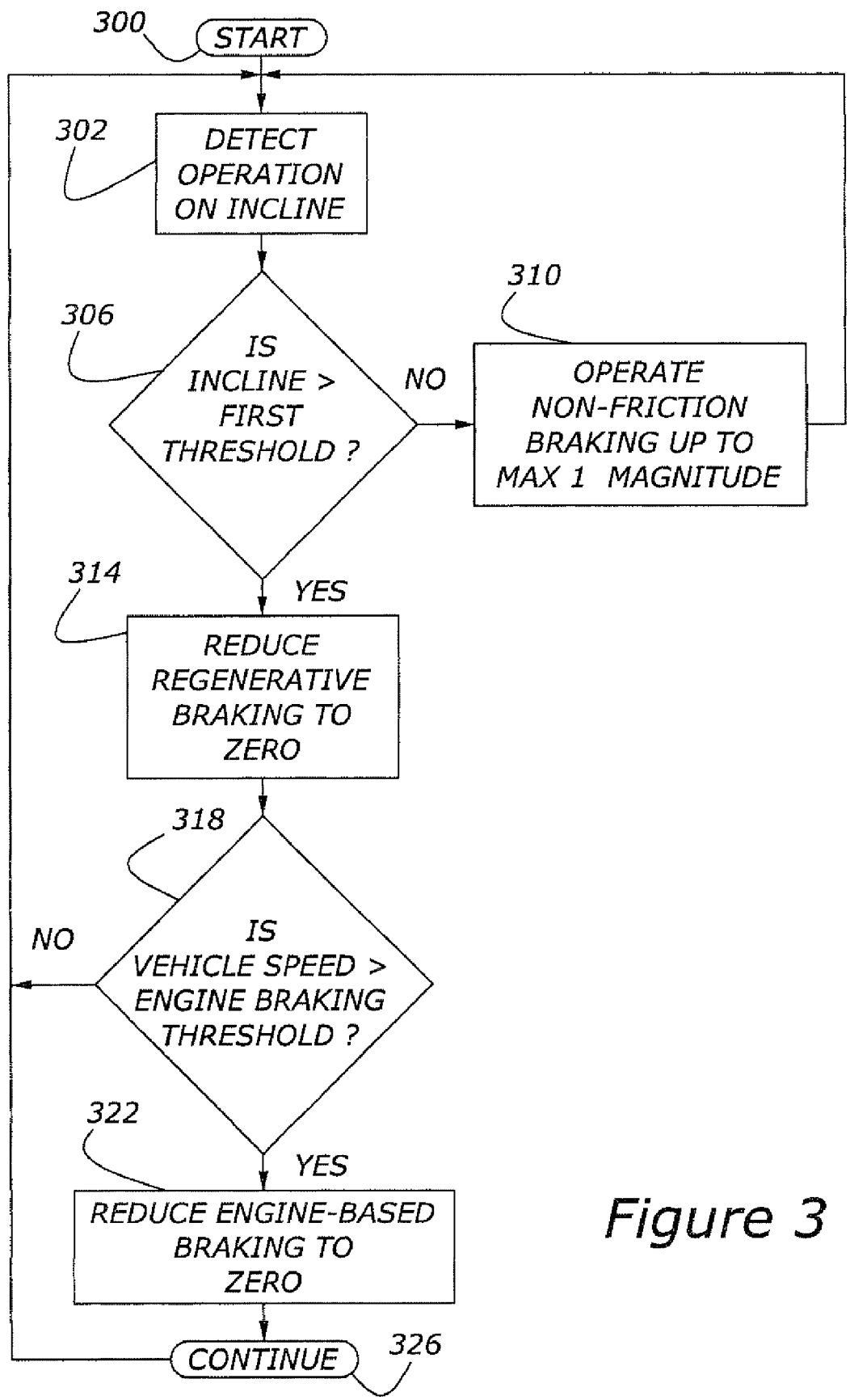
FIG. 3 is a flow chart depicting a second embodiment of a hill descent control method according to the present invention.

FIG. 3 shows a second embodiment of the present invention in which operation on an incline is sensed as before at block 302, and then at block 306 if the value of the incline is greater than the first inclination threshold, the non-friction braking is operated at block 310 at a force level up to the MAX1 magnitude. However, at block 314, if the magnitude of the inclination is greater than the first threshold, regenerative braking is reduced to zero at block 314. Then, at block 318, a question is posed regarding vehicle speed. If the vehicle speed is greater than an engine braking threshold speed, the engine-based braking will be reduced to zero at block 322 before the routine continues at block 326. In this manner, both the regenerative and the engine braking are controlled as a function of the angle of inclination upon which the vehicle is being operated, and the engine braking is further being controlled by means of the vehicle speed. Alternatively, both the engine braking and the regenerative braking may be controlled according to detected slope and vehicle speed.

In yet another embodiment, both the regenerative and the engine-based braking may be controlled not only as a function of vehicle inclination, but also as a function of vehicle speed. According to another embodiment, controller 78, upon detecting that the vehicle's driver has activated hill descent switch 75 in block 204 of FIG. 2, or block 302 of FIG. 3, will limit regenerative braking. This may be accomplished either with or without use of inclination sensing. In cases in which inclination sensing is not employed, regenerative braking may be set to a fixed value including, but not limited to, a zero value.

In the event that incline detection is limited to use of hill descent switch 75, non-friction braking will be controlled in a feed-forward manner equivalent to operation at an incline greater than the first threshold of block 208 within FIG. 2, or block 306 within FIG. 3. The MAX 2 magnitude will be less than the MAX 1 value. If incline detection includes only a direct slope sensor, or a combination of direct slope sensing and side slope sensing, either of the algorithms of FIGS. 2 and 3 may be employed, with controller 78 using the combined inputs from both sensors. Alternatively, the amount of non-friction braking may be inversely proportional to the magnitude of the detected slope. In a preferred embodiment, both hill descent switch 75 and one or more slope sensors are integrated into the present system, giving the vehicle's driver the option to selectively deactivate the descent control feature.

While particular embodiments of the invention have been shown and described, numerous variations and alternate embodiments will occur to those skilled in the art. Accordingly, it is intended that the invention be limited only in terms of the appended claims.

What is claimed is:

1. An automotive braking system, comprising:
a friction braking subsystem;
a non-friction braking subsystem;
an incline detection system for determining when a vehicle equipped with said braking system is being operated on an incline, with said incline detection system further determining the magnitude of said incline; and
a controller for operating the non-friction braking subsystem based upon at least the output of said incline detection system, with said controller providing a first maximum amount of non-friction braking when said vehicle is being operated upon a surface having an inclination less than a predetermined threshold inclination, and a second maximum amount of non-friction braking when said vehicle is being operated on a surface having an inclination greater than said predetermined threshold, with said second maximum amount of braking being less than said first maximum amount of braking.

2. An automotive braking system according to claim 1, wherein said non-friction braking subsystem comprises a regenerative braking system.

3. An automotive braking system according to claim 2, wherein said second maximum amount of braking provided by the controller and said regenerative braking system is generally inversely proportional to the magnitude and direction of an incline upon which said vehicle is being operated.

4. An automotive braking system according to claim 2, further comprising a vehicle speed sensor operatively connected with said controller, and with said controller operating the regenerative braking system so as to limit regenerative braking at speeds below a predetermined speed threshold.

5. An automotive braking system according to claim 1, wherein said non-friction braking subsystem comprises an engine-based braking system.

6. An automotive braking system according to claim 5, further comprising a vehicle speed sensor operatively connected with said controller, and with said controller operating the engine-based braking system so as to limit engine braking at speeds below a predetermined speed threshold.

7. An automotive braking system according to claim 1, wherein said non-friction braking subsystem comprises a regenerative braking system and an engine-based braking system.

8. An automotive braking system according to claim 7, further comprising a vehicle speed sensor operatively connected with said controller, and with said controller operating the engine-based braking system and the regenerative braking system such that said controller limits engine braking and regenerative braking at speeds below a predetermined speed threshold.

9. An automotive braking system according to claim 7, further comprising a vehicle speed sensor operatively connected with said controller, and with said controller operating the engine-based braking system and the regenerative braking system such that said controller limits engine braking at vehicle speeds below a predetermined engine braking threshold, and with said controller limiting regenerative braking at speeds below a predetermined regenerative braking threshold.

10. An automotive braking system according to claim 1, wherein said incline detection system produces an output corresponding to the magnitude of the incline upon which a vehicle is being operated.

11. An automotive braking system according to claim 1, wherein said incline detection system produces an output in response to a condition established by the vehicle's operator.

12. An automotive braking system according to claim 1, wherein said incline detection system produces an output corresponding not only to the magnitude of the incline upon which a vehicle is being operated, but also in response to a condition established by the vehicle's operator.

13. An automotive braking system according to claim 1, wherein said incline detection system detects that an operator has selectively chosen to operate a vehicle in an incline descent mode.

14. An automotive braking system according to claim 1, wherein said second maximum amount of non-friction braking is zero braking.

15. An automotive braking system according to claim 1, wherein said second maximum amount of non-friction braking is an amount of braking greater than zero.

16. An automotive braking system according to claim 1, wherein said incline detection system comprises a sensor responsive to operation on a direct slope.

17. An automotive braking system according to claim 1, wherein said incline detection system comprises a sensor responsive to operation on a side slope.

18. An automotive braking system according to claim 1, wherein said incline detection system comprises a sensor responsive to, operation on either a side slope or on a direct slope.

19. A method for operating an automotive braking system having a friction braking subsystem and a non-friction braking subsystem comprising an engine-based braking system and a regenerative braking system, said method comprising:
detecting operation of a vehicle, equipped with said braking system, upon an incline, including detecting the magnitude of an incline;
providing a first maximum permissible amount of non-friction braking when a vehicle equipped with said braking system is being operated upon a surface having a magnitude of inclination less than a first predetermined threshold inclination; and providing a second maximum permissible amount of non-friction braking when said vehicle is being operated upon a surface having a magnitude of inclination greater than said first predetermined threshold, with said second maximum permissible amount of braking being less than said first maximum permissible amount of braking.

20. A method according to claim 19, further comprising:
reducing the braking provided by said regenerative braking system to zero if said vehicle is being operated upon a surface having an inclination greater than said first predetermined threshold.

21. A method according to claim 19, further comprising:
reducing the braking provided by said engine-based braking system to zero if said vehicle is being operated upon a surface having a inclination greater than said first predetermined threshold and if the speed of the vehicle is less than a predetermined engine braking threshold.

22. A method according to claim 19, further comprising:
reducing the braking provided by said regenerative braking system to zero if said vehicle is being operated upon a surface having an inclination greater than said first predetermined threshold; and
reducing the braking provided by said engine-based braking system to zero if said vehicle is being operated upon a surface having an inclination greater than said first predetermined threshold and if the speed of the vehicle is less than a predetermined engine braking threshold.

23. A method according to claim 19, wherein said second maximum permissible amount of non-friction braking is inversely proportional to the magnitude of an incline upon which said vehicle is being operated.

* * * * *